United States Patent
Lundström et al.

(10) Patent No.: US 6,665,522 B1
(45) Date of Patent: Dec. 16, 2003

(54) METHOD AND ARRANGEMENT IN A RADIO COMMUNICATION SYSTEM

(75) Inventors: Anders Lundström, Karlstad (SE); Scott Hicks, Apex, NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/465,769

(22) Filed: Dec. 17, 1999

(30) Foreign Application Priority Data

Dec. 18, 1998 (SE) .............................................. 9804428

(51) Int. Cl.⁷ ................................................. H04B 7/00
(52) U.S. Cl. .......................... 455/67.4; 455/69; 455/63; 455/522; 370/475; 370/479
(58) Field of Search .................. 455/436, 452, 455/414, 516, 553, 63, 69, 67.4, 522, 67.3, 67.6; 370/475, 479, 468, 329, 346–348, 330, 335–337, 342, 321–322

(56) References Cited

U.S. PATENT DOCUMENTS

| | | | |
|---|---|---|---|
| 5,483,676 A | 1/1996 | Mahany et al. | 455/67.4 |
| 5,517,507 A | 5/1996 | Needham et al. | 371/32 |
| 5,526,399 A | 6/1996 | Kameda | 379/58 |
| 5,699,367 A | 12/1997 | Haartsen | 371/33 |
| 5,828,672 A | 10/1998 | Labonte et al. | 371/5.5 |
| 5,940,769 A * | 8/1999 | Nakajima et al. | 455/509 |
| 5,949,769 A * | 9/1999 | Davidson et al. | 370/329 |
| 6,240,079 B1 * | 5/2001 | Hamalainen et al. | 370/337 |
| 6,366,763 B1 * | 4/2002 | Ue et al. | 455/69 |

FOREIGN PATENT DOCUMENTS

| | | |
|---|---|---|
| GB | 2 322 047 | 8/1998 |
| WO | WO98/37713 | 8/1998 |

OTHER PUBLICATIONS

International Search Report Request No. SE 98/01488.
TIA/EIA IS–136.1 Rev. A & 2 Addenda, Apr. 1997.

* cited by examiner

*Primary Examiner*—Pablo Tran (57) ABSTRACT

The present invention is related to a method and arrangement in a radio communication system for performing a message transfer transaction in which at least one message is transferred in at least one frame from a first unit to a second unit. Properties of radio signals exchanged between the first unit and the second unit are measured (501). A mode of informing the first unit of frame receipt status at the second unit during the message transfer transaction is selected (502) based on the measured radio signal properties. The at least one frame is transferred (503) from the first unit to the second unit while the first unit is informed of the frame receipt status at the second unit in accordance with the selected mode of informing.

32 Claims, 5 Drawing Sheets

METHOD AND ARRANGEMENT IN A RADIO COMMUNICATION SYSTEM

This application claims priority under 35 U.S.C. §§119 and/or 365 to 9804428-2 filed in Sweden on Dec. 18, 1998; the entire content of which is hereby incorporated by reference.

1. Technical Field of the Invention

The invention relates to a method and an arrangement in a radio communication system. More precisely, the invention relates to a way of transferring messages between a first unit and a second unit in the radio communication system.

2. Description of Related Art

A typical way of transferring messages from a first unit to a second unit in a communication system is to divide a message, alternatively refered to as a data packet, into one or several frames and transfer said frames from the first unit to the second unit. The content of a frame may become corrupted during transfer from the first unit to the second unit. Thus at the receiving second unit, some kind of error detecting mechanism, typically based on cyclic redundancy check is used to detect if the content of the frame is in error. A typical way of redeeming errors that occur during transmission of frames is to use some kind of automatic repeat request (ARQ) scheme. The basic idea behind ARQ is for the receiving unit to inform the sending unit of the receipt status of received frames and then for the sending unit to retransmit those frames which were not correctly received by the receiving unit. In TIA/EIA IS-136 a variant of ARQ is defined for a digital control channel (DCCH) in the downlink direction, i.e. for transfer of messages from a base station to a mobile station, and for a digital traffic channel (DTC) in both the downlink and the uplink direction. In this variant of ARQ, the sending party controls how often the receiving party reports the receipt status of received frames by setting a bit called the Polling Indicator (PI) to request a STATUS frame from the receiving unit.

U.S. Pat. No. 5,699,367 discloses a retransmission method in a communication system wherein data packets are transmitted over a connection comprising cascaded links that have different properties with respect to cost, data rate or transmission quality. One of the cascaded links is considered to be the most sensitive link. According to the method, only packets actually disturbed in the sensitive link are retransmitted over the sensitive link at the same time as required storage capacity in relay stations connecting the sensitive link to nonsensitive links is reduced. Errors occuring in the sensitive link will cause retransmission over nonsensitive links of the connection as well, but this is of less importance since the nonsensitive links have a high throughput and/or low costs.

SUMMARY OF THE INVENTION

The problem dealt with by the present invention is to provide a more flexible way of performing a message transfer transaction in which at least one message is transferred in at least one frame from a first unit to a second unit in a radio communication system.

The problem is solved essentially by a method and arrangement in which a mode of informing the first unit of frame receipt status at the second unit is selected based on prevailing conditions for radio communication between the first unit and the second unit.

More specifically, the problem is solved in the following manner. Properties of radio signals exchanged between the first unit and the second unit are measured. The mode of informing the first unit of the frame receipt status at the second unit during the message transfer transaction is selected based on the measured radio signal properties. The at least one frame is transferred from the first unit to the second unit while the first unit is informed of the frame receipt status at the second unit in accordance with the selected mode of informing.

One general object of the invention is to provide a more flexible way of performing a message transfer transaction in which at least one frame is transferred from a first unit to a second unit in a radio communication system.

A more specific object of the invention is to provide a way of performing a message transfer transaction in which a mode of informing the first unit of frame receipt status at the second unit may be selected based on the prevailing conditions for radio communication between the first unit and the second unit.

An advantage afforded by the invention is that use of bandwith as well as transaction duration can be reduced when performing a message transfer transaction in good conditions for radio communication, while still providing a required message transfer robustness when performing a message transfer transaction in bad conditions for radio communication.

DETAILED DESCRIPTION OF THE EMBODIMENTS

Figure 1:
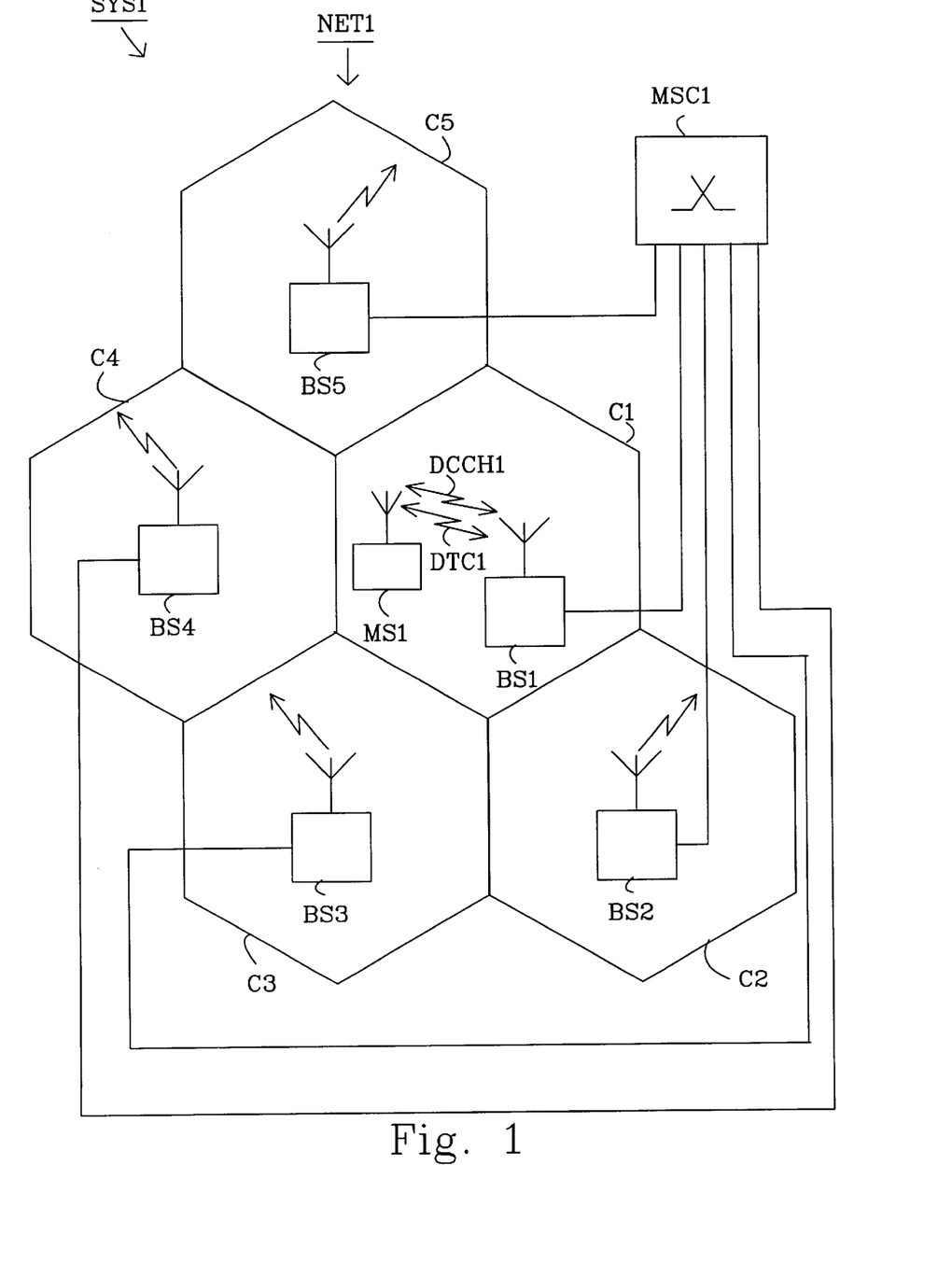
FIG. 1 is a view of a radio communication system supporting the TIA/EIA IS-136 air interface.

FIG. 1 illustrates a radio communication system SYS1 comprising a radio communication network in the form of a cellular network NET1 and a first mobile station MS1. In the exemplary radio communication system SYS1 illustrated in FIG. 1, communication between the cellular network and the first mobile station MS1 is based on the TIA/EIA IS-136 air interface specifications. Note that the invention is in no way limited in its application to only TIA/EIA IS-136 compliant radio communication systems. The cellular network NET1 comprises a mobile services switching centre MSC1 and base stations BS1–BS5 connected to the mobile services switching centre MSC1. The base stations BS1–BS5 provide radio coverage in a geographical area served by the mobile services switching centre MSC1. The geographical area is divided into a number of cells C1–C5. In each cell C1–C5 radio coverage is provided by one of the base stations BS1–BS5 respectively. The cell C1 in which the first mobile station MS1 is currently located is denoted the serving cell and the corresponding base station BS1 is denoted the serving base station. The mobile services switching centre MSC1 is responsible for switching calls to and from mobile stations located in the geographical area served by the mobile services switching centre MSC1. Note that in FIG. 1 only elements necessary for illustrating the present invention are illustrated and that a typical cellular network comprises several mobile services switching centres, a greater number of base stations as well as other types of nodes such as home location registers.

A set of bidirectional radio frequency channels are allocated to the serving cell C1 for communication between the base station BS1 and mobile stations, e.g. MS1, operating within the cell C1. Each radio frequency channel consists of a pair of separate radio frequencies, one for communication in the downlink direction, i.e. from the serving base station BS1 to mobile stations, and one for communication in the uplink direction, i.e. from mobile stations to the serving base station BS1.

Using a time division multiple access (TDMA) scheme, physical channels are defined in TIA/EIA IS-136 by dividing a radio frequency channel into a series of repeating time slots organized in TDMA-frames and assigning the time slots to different physical channels. Each TDMA-frame consists of 6 time slots which can be used to support three full rate channels, by assigning two time slots to each full rate channel, or six half rate channels, by assigning one time slot to each half rate channel, on a single radio frequency channel. Communication on a physical channel occurs by transmitting bursts of digital data as digitally modulated radio signals on the radio frequency channel in the time slots assigned to the physical channel.

The physical channels can either be used as digital traffic channels (DTC) or as digital control channels (DCCH). The DCCH is used for transmission of control information between a base station and one or a plurality of mobile stations operating within a cell served by the base station. The digital control channel is also used for transmission of user data in the form of Short Message Services (SMS) messages to mobile stations operating within the cell. The DTC is used for transmission of voice or user data traffic as well as control information between a base station and a specific mobile station during a call. FIG. 1 illustrates how the first mobile station MS1 and the serving base station BS1 may communicate either using a digital control channel DCCH1 or a digital traffic channel DTC1. In idle mode, i.e. when no call is in progress, the first mobile station MS1 camps on the digital control channel DCCH1. However, upon designation of a digital traffic channel DTC1 during call establishment, the first mobile station MS1 leaves the digital control channel DCCH1 and for the duration of the call, all communication between the serving base station BS1 and the first mobile station MS1 occurs on the digital traffic channel DTC1.

A number of logical channels are mapped onto a physical channel used as a digital control channel by assigning different TDMA-frames to different logical channels.

In the uplink direction there is a single logical channel:
  random access channel (RACH).
In the downlink direction there are a number of logical channels:
  shared channel feedback (SCF);
  short message service, paging, access response channel (SPACH);
  broadcast control channel (BCCH).

The logical channel SPACH may be further divided into subchannels:
  paging channel (PCH), for sending paging messages;
  access response channel (ARCH), for responding to attempted accesses;
  short-message-service channel (SMSCH), for sending short-message-service messages.

Figure 2:
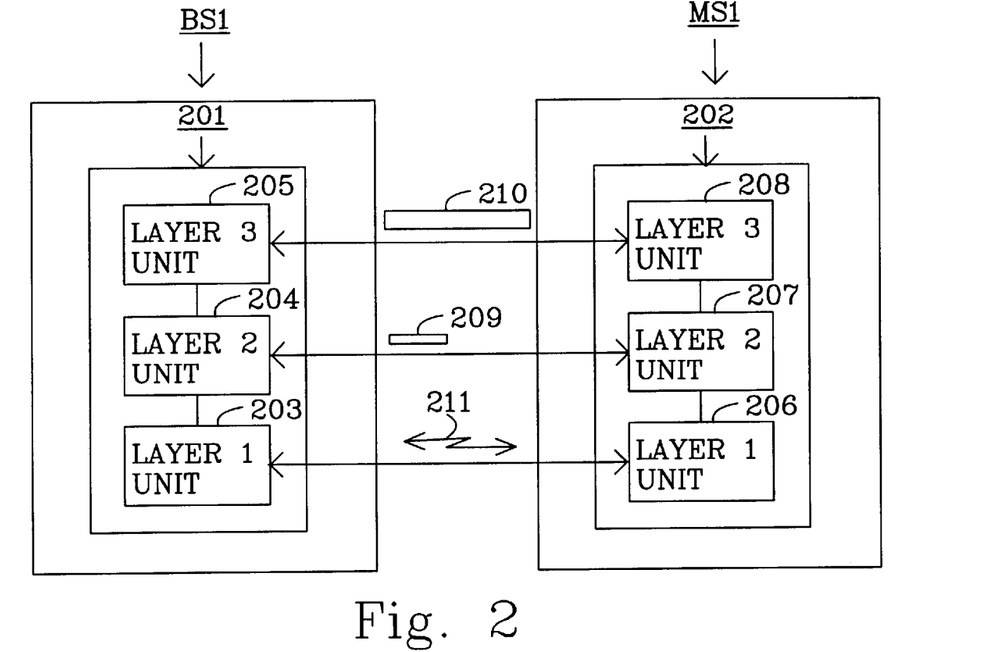
FIG. 2 is a block diagram illustrating communication function blocks and function units at a base station and a mobile station.

FIG. 2 is a schematic block diagram illustrating a first communication function block 201 at the serving base station BS1 and a second communication function block 202 at the first mobile station MS1. The function blocks 201 and 202 interact with each other in accordance with the TIA/EIA IS136 specifications when communicating information between the serving base station BS1 and the first mobile station MS1. The first communication function block 201 comprises three function units, a layer 1 unit 203, a layer 2 unit 204 and a layer 3 unit 205. The second communication function block 202 comprises corresponding function units 206–208. The division of the communication function blocks 201 and 202 into function units corresponds to the way the TIA/EIA IS-136 specification is arranged in specifications for different layers. Thus each function unit interacts with its corresponding peer function unit according to the respective protocol defined for the layer.

The layer 3 function units 205, 208 perform layer 3 functions in accordance with the TIA/EIA IS-136 specifications. Thus the respective layer 3 unit 205, 208 communicates with its peer layer 3 unit 208, 205 by transmitting and receiving messages 210 such as Page, Page Response, Origination, Registration, R-DATA, Digital Traffic Channel designation etc. The layer 3 unit 205 or 208 transmitting a message 210, passes the message content to its local layer 2 function unit 204, 207 respectively while the peer layer 3 unit 208 or 205 receives the message content from its local layer 2 unit 207, 204.

The layer 2 function units 204, 207 perform layer 2 functions in accordance with the TIA/EIA IS-136 specifications. Thus the respective layer 2 unit 204 or 207 communicates with its peer layer 2 unit 207, 204 by transmitting and receiving frames 209 according to a set of distinct layer 2 protocols. Different layer 2 protocols are specified for the different logical channels and sub channels. The layer 2 function unit 204 or 207 receiving a message from its local layer 3 unit 205, 208, segments the message into the required amount of frames 209 and transmits the frames to the peer layer 2 function unit 207, 204. The peer layer 2 function unit 207, 204 receives the frames 209 and performs the reverse operation of reassembling the message and passing the message to its local layer 3 unit 208, 205 respectively. The layer 2 function units 204, 207 apply the layer 2 protocol applicable for the logical channel and subchannel on which the message is communicated.

The layer 1 function units 203, 206 perform layer 1 functions in accordance with the TIA/EIA IS-136 specifications. Thus the respective layer 1 unit 203, 206 maps layer 2 information, i.e. frames, received from its local layer 2 unit 204, 207 into bursts and transmits each burst using digitally modulated radio signals 211 in the appropriate time slot to the peer layer 1 unit 206, 203 respectively. The peer layer 1 unit 206, 203 receives the transmitted burst and performs the reverse operation of reconstructing the layer 2 information and passing the layer 2 information to its local layer 2 unit 207, 204.

For communication on the subchannels ARCH and SMSCH of the downlink logical channel SPACH, the TIA/EIA IS-136 provides both an unacknowledged and an acknowledged mode of layer 2 operation.

In the unacknowledged mode of operation, the layer 2 unit 204 at the serving base station BS1 receives no information from the peer layer 2 unit 207 at the first mobile station MS1 regarding frame receipt status, i.e. whether frames 209 transmitted by the serving base station BS1 have been correctly received at the first mobile station MS1.

In the acknowledged mode of operation, also known as Automatic Retransmission Request or Automatic Repeat Request (ARQ), the layer 2 unit 204 at the serving base station BS1 receives information from the peer layer 2 unit 207 at the first mobile station MS1 of the frame receipt status. The layer 2 unit 204 at the serving base station BS1 may then retransmit frames 209 which were not correctly received at the first mobile station MS1.

Figure 3:
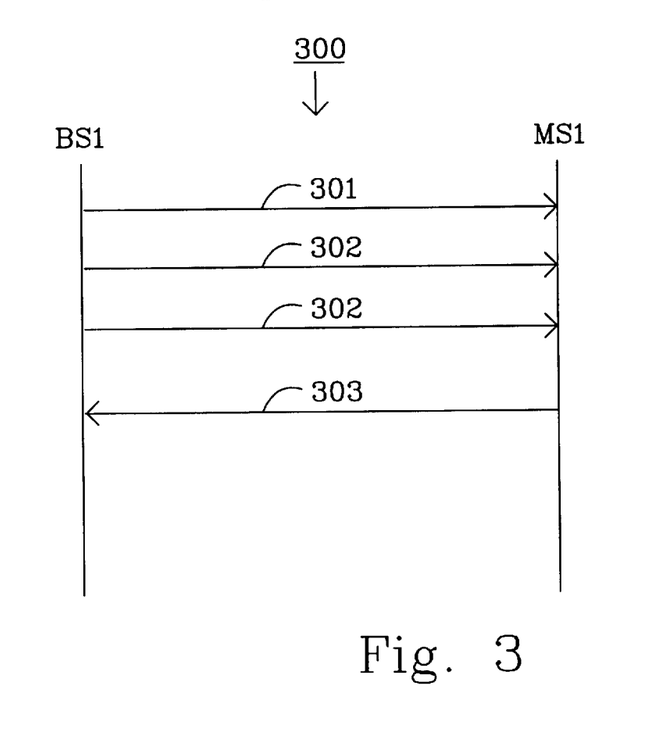
FIG. 3 is a signalling diagram illustrating transfer of a message using ARQ mode.
Figure 4:
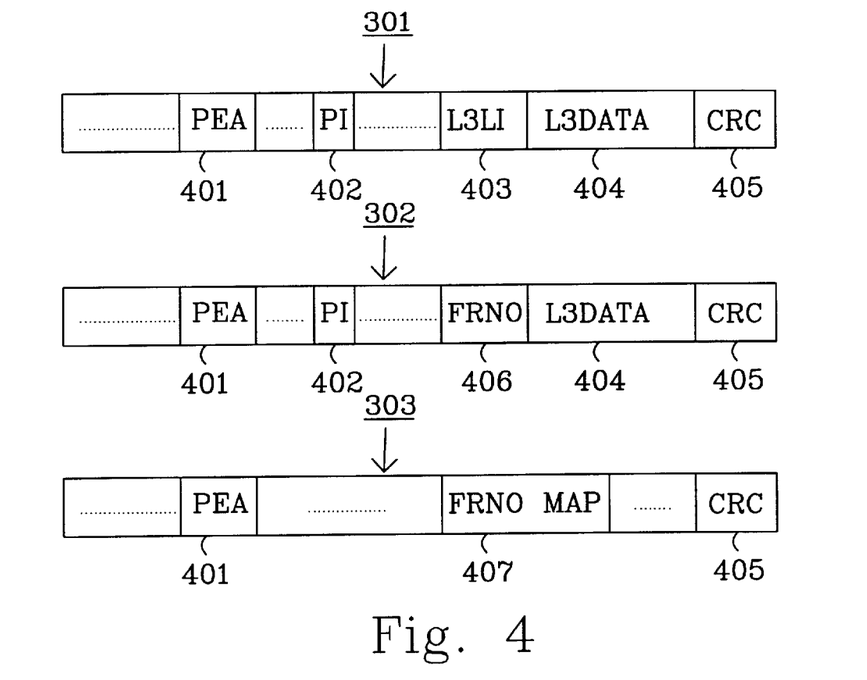
FIG. 4 is a schematic block diagram of frame formats used in ARQ mode.

The signalling diagram of FIG. 3 illustrates an example of a message transfer transaction 300 in which a message is transferred using an ARQ mode of operation. The message content is divided into three frames 301, 302, 302 transferred in the down link direction from the serving base station BS1 to the first mobile station MS1. In addition to the three frames 301, 302, 302 transmitted in the downlink direction, the message transfer trasaction includes a frame 303 transmitted in the uplink direction to report frame receipt status at the first mobile station MS1. FIG. 4 contains a schematic block diagram of the frame formats used in ARQ mode.

The first part of the message is transmitted in an ARQ Mode BEGIN frame 301. The BEGIN frame comprises amongst other fields, a Partial Echo Assigned (PEA) field 401, a Polling Indicator (PI) field 402, a Layer 3 Length Indicator (L3LI) field 403, a Layer 3 Data field (L3DATA) 404 and a Cyclic Redundancy Code (CRC) field 405. The content of the PEA field 401 is used as an identifier for the message transfer transaction identifying the frames which belong to the message transfer transaction. The L3LI field 403 indicates the length of the message, enabling the first mobile station MS1 to determine how many frames it must receive in order to receive the complete message. The L3DATA field 404 contains actual message data. The CRC field 405 contains a checksum enabling the first mobile station MS1 to detect if the frame has become corrupted.

The value of the PI field 402 determines whether the first mobile station MS1 is required to respond by transmitting a SPACH ARQ STATUS frame 303 upon receipt of the ARQ BEGIN frame 301 or not. In this example the PI field 402 of the ARQ BEGIN frame 301 is set to zero, indicating that no SPACH ARQ STATUS frame 303 is required from the first mobile station MS1.

The second part of the message is transmitted in a first ARQ CONTINUE frame 302. The ARQ CONTINUE frame 302 comprises a PEA field 401, a PI field 402, a L3DATA field 404 and a CRC field 405. In addition to these fields, the ARQ CONTINUE frame 302 also comprises a Frame Number (FRNO) field 406. The FRNO field uniquely identifies the ARQ CONTINUE frame 302 within the message transfer transaction. The PI field 402 of the first ARQ CONTINUE frame 302 is also set to zero, indicating that no SPACH ARQ STATUS frame 303 is to be sent upon receipt of the first ARQ CONTINUE frame 302 by the first mobile station MS1.

The third and last part of the message is transmitted in a second ARQ CONTINUE frame 302. The PI field of the second ARQ CONTINUE frame 302 is set to one, indicating that the first mobile station MS1 should provide feedback information to the serving base station BS1 on the frame receipt status at the first mobile station MS1 for the message transfer transaction. Thus, the first mobile station MS1 responds by sending a SPACH ARQ STATUS frame 303 to the serving base station BS1. Note that while the ARQ BEGIN frame 301 and the ARQ CONTINUE frames 302 were transmitted on the downlink SPACH logical channel, the SPACH ARQ STATUS frame 303 is transmitted on the uplink RACH logical channel.

The SPACH ARQ STATUS frame 303 comprises a PEA field 401 and a CRC field 405. In addition to these fields 401, 405, the ARQ STATUS frame 303 also comprises a Frame Number Map (FRNO MAP) field 407. The FRNO MAP field 407 contains a bitmap wherein the different bit positions correpond to ARQ CONTINUE frames 302 transmitted during the message transfer transaction. A zero in a bit position indicates that the first mobile station MS1 has not correctly received the ARQ CONTINUE frame 302 corresponding to the bit position. Using the bitmap, the serving base station BS1 can determine whether any transmitted frames have been lost and if so, identify and retransmit those lost frames.

By setting the PI field 402 to one in the last ARQ CONTINUE frame 302, the serving base station BS1 receives frame receipt status information for the complete message transfer transaction.

In present CMS88 systems, i.e. Ericssons mobile services switching centres and base station products supporting TIA/EIA IS-136, messages requiring more than one frame which are transmitted downlink from a base station to a mobile station on the ARCH or SMSCH subchannels are transferred using the ARQ mechanism. The PI field is set to one in the ARQ BEGIN frame, and to zero in all subsequent ARQ CONTINUE frames except the very last ARQ CONTINUE frame in which the PI field is again set to one. One purpose of setting the PI field to one in the ARQ BEGIN frame is to check whether the mobile station is listening in order to determine whether the serving base station BS1 should transmit the ARQ CONTINUE frames. Also, if the mobile station does not receive the ARQ BEGIN message, it will not receive the subsequent ARQ CONTINUE frames either since the mobile station will not be aware of the PEA-value assigned for the message transfer transaction. The purpose of setting the PI field to one in the last ARQ CONTINUE frame is to elicit a SPACH ARQ STATUS frame from the mobile station to find out exactly which frames, if any, were unsuccessfully received during the transfer and thus should be retransmitted accordingly.

This way of applying the ARQ mechanism is not optimal for all message transfer situations due to variance of the conditions for radio communication between the base station and the mobile station and variance of the message transfer duration. For example, during favourable conditions for radio communication when the mobile station is receiving the downlink digital control channel signals at a strong signal strength with no or few bit errors, it may not be necessary to use the ARQ mechanism at all. This is because the mobile station should not likely miss any of the downlink frames. Since not using ARQ eliminates the need for the mobile station to send status responses, the transfer duration is reduced as well as the uplink bandwith required. On the other hand, during very poor conditions for radio communication, it might be beneficial to prompt the mobile station very often for its current status. This is because if the base station does not get any further responses from the mobile station, the base station can end that message transfer transaction at an early stage and free up precious ARCH and SMSCH bandwith for other message transfer transactions.

Figure 5:
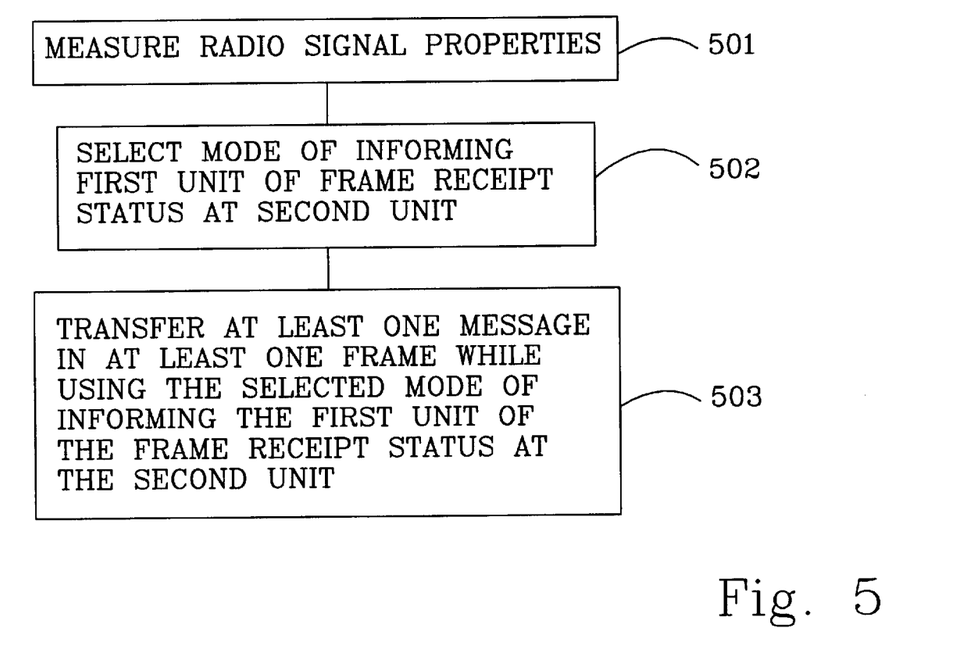
FIG. 5 is a flow chart illustrating a basic method for transferring a message according to the invention.

FIG. 5 is a flow chart illustrating a basic method according to the invention for performing a message transfer transaction in which at least one message is transferred in at least one frame from a first unit to a second unit in a radio communication system.

At step 501 properties of radio signals exchanged between the first unit and the second unit are measured. The measured signal properties reflect the conditions for radio communication between the first unit and the second unit.

At step 502 a mode of informing the first unit of frame receipt status at the second unit during the message transfer transaction is selected based on the measured radio signal properties.

At step 503 the at least one message is transferred in the at least one frame from the first unit to the second unit using digitally modulated radio signals. The first unit is informed of the frame receipt status at the second unit during the message transfer transaction in accordance with the selected mode of informing. In response to receiving information indicating that a transmitted frame has not been correctly received, the first unit may retransmit that frame.

Measuring step 501 and selection step 502 may be performed prior to transferring any one of the at least one frame to the second unit. However, steps 501 and 502 may also be performed after transfer of frames to the second unit has begun, i.e. an initial mode of informing selected prior to transferring any frames to the second unit may be modified during the message transfer transaction.

The selection step 502 may comprise selecting either an unacknowledged mode or an acknowledged mode of informing. In the unacknowledged mode, the first unit is provided with no information of the frame receipt status at the second unit, while in the acknowledged mode, the first unit is provided with information of the frame receipt status upon receipt of at least one of the frames by the second unit. The acknowledged mode of informing is preferably selected to provide an increased message transfer robustness when performing the message transfer transaction in bad conditions for radio communication, while the unacknowledged mode is selected to reduce protocol overhead when performing the message transfer transaction in good, or at least better, conditions for radio communication.

The selection step 502 may alternatively comprise selecting to inform the first unit of the frame receipt status at the second unit upon receipt of one or several elected frames by the second unit. For example, if the message transfer transaction comprises transfer of at least three frames from the first unit to the second unit, the second unit may be required to inform the first unit of the frame receipt status upon receipt of the first frame, the last frame and/or a frame in between the first and the last frame. The first unit is preferrably informed of the frame receipt status at the second unit more frequently when performing the message transfer transaction in bad conditions for radio communication and less frequently when performing the message transfer transaction in better conditions for radio communication.

The selection step 502 may of course also comprise an initial selection of unacknowledged or acknowledged mode and, provided an acknowledged mode is selected, a further selection of e.g how frequently the second unit should inform the first unit of the frame receipt status at the second unit.

In the context of the radio communication system SYS1 in FIG. 1, the inventive method may be applied for transferring messages on the subchannels ARCH and SMSCH in the downlink direction of the digital control channel DCCH1. The inventive method may however also be applied for transfer of messages on the digital traffic channel DTC1 in both the downlink and the uplink directions.

When applying the method for transferring messages in the downlink direction, either on the digital control channel DCCH1 or on the digital traffic channel DTC1, the serving base station BS1 is acting as the first unit and the first mobile station MS1 is acting as the second unit.

When applying the method for transferring messages in the uplink direction of the digital traffic channel DTC1, the first mobile station MS1 is acting as the first unit and the serving base station BS1 is acting as the second unit.

When applying the method for transferring messages in the downlink direction of either the digital control channel DCCH1 or the digital traffic channel DTC1, the measuring of signal properties at step 501 may comprise measuring properties of radio signals received by the serving base station BS1 from the first mobile station MS1 in the uplink direction of the respective channel DCCH1 or DTC1 and/or measuring properties of radio signals received by the first mobile station MS1 in the downlink direction of the respective channel DCCH1 or DTC1. Signal properties measured by the first mobile station MS1 are reported to the serving base station BS1. If measurements are performed on the digital control channel DCCH1, i.e. when the first mobile station MS1 is camping on the DCCH1, the signal properties may be reported using the Mobile Channel Assisted Allocation (MACA) feature of the TIA/EIA IS-136 specifications. If measurements are performed on the digital traffic channel DTC1, the signal properties may be reported using the Mobile Assisted Handoff (MAHO) feature of the TIA/EIA IS-136 specifications.

When applying the method for transferring messages in the uplink direction of the digital traffic channel DTC1, the measuring of signal properties at step 501 comprises measuring properties of radio signals received by the first mobile station MS1 from the serving base station BS1 in the downlink direction of the digital traffic channel DTC1.

Figure 6:
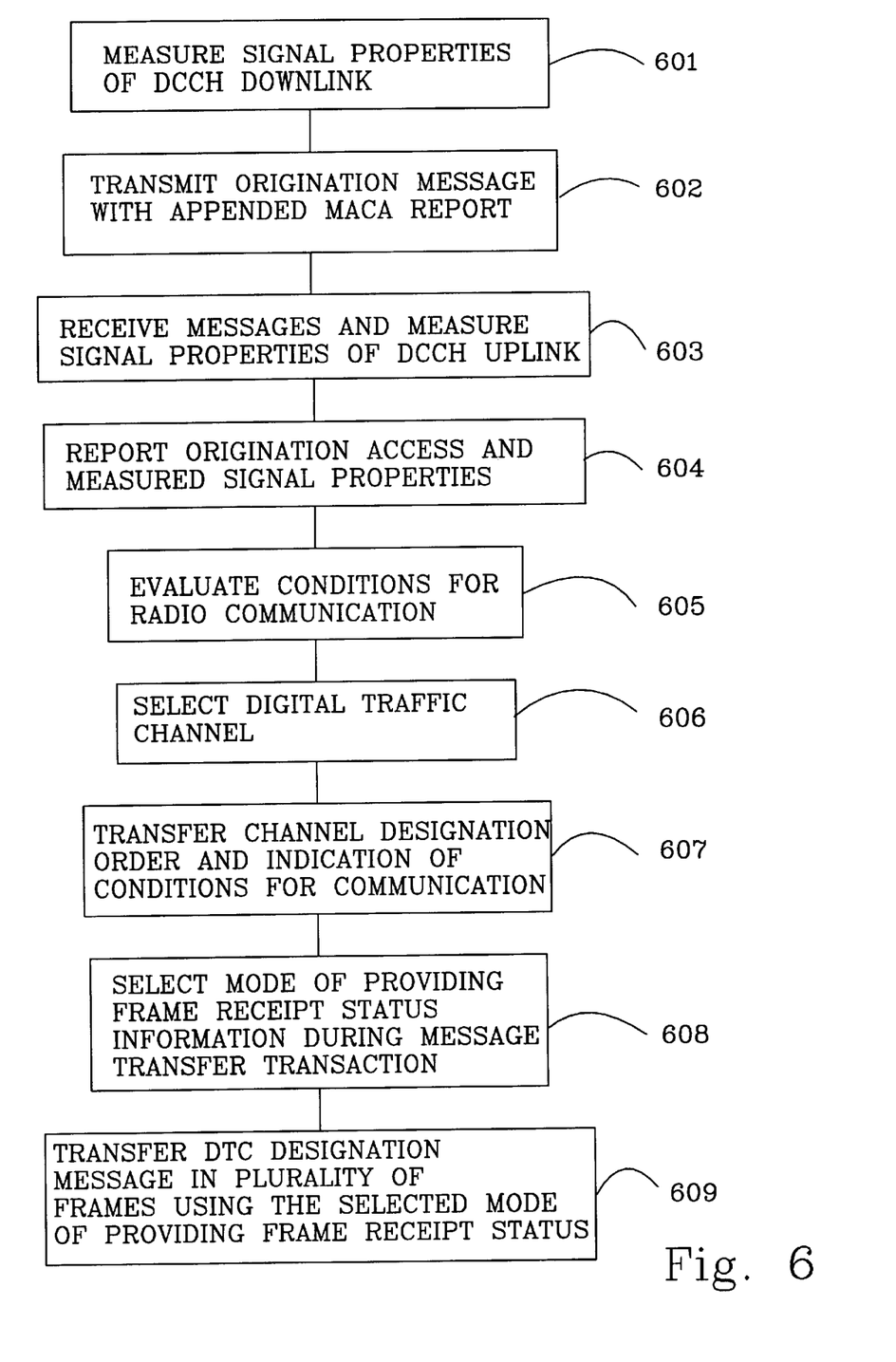
FIG. 6 is a flow chart illustrating a mode detailed example of how the inventive method may be applied in the radio communication system in FIG. 1.

FIG. 6 is a flow chart demonstrating a more detailed example of how the inventive method may be applied in the radio communication system SYS1 for transferring messages in the downlink direction of the digital control channel DCCH1.

Figure 7:
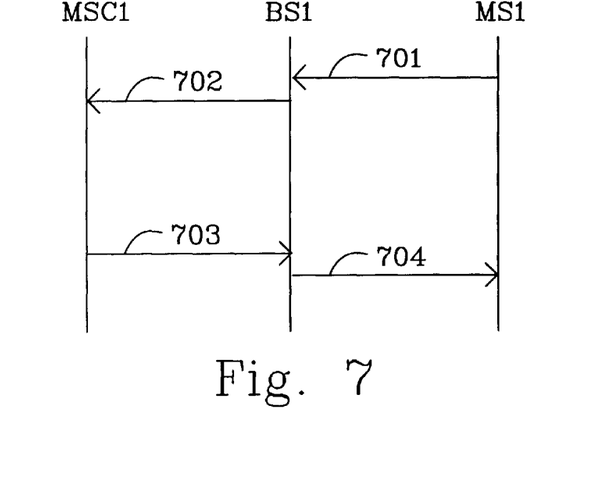
FIG. 7 is a signalling diagram illustrating messages transferred between different units when performing the method illustrated in FIG. 6.

FIG. 7 is a signalling diagram illustrating messages transferred between different units in the radio communication system SYS1 when performing the method according to FIG. 6.

At step 601, the first mobile station MS1 is camping on the digital control channel DCCH1 and performs measurements of signal properties on radio signals received in the downlink direction of the digital control channel DCCH1. The serving base station BS1 is broadcasting a Mobile Assisted Channel Allocation (MACA) message on the logical channel BCCH, where it instructs the first mobile station MS1 to perform MACA measurements on the forward digital control channel DCCH1. The serving base station BS1 may request the first mobile station MS1 to perform Long-Term MACA, wherein the mobile station MS1 measures word error rate, bit error rate and paging frame received signal strength, and/or Short-Term MACA, wherein the first mobile station MS1 measures short term received signal strength.

At step 602 an outgoing call from the first mobile station MS1 is initiated and the first mobile station MS1 transmits a TIA/EIA IS-136 Origination message. The first mobile station MS1 also reports the results of the performed MACA measurements by appending a MACA Report message to the Origination message. FIG. 7 illustrates how the concatenated Origination and MACA report messages 701 are transferred from the first mobile station MS1 to the serving base station BS1 on the uplink RACH of the digital control channel DCCH1.

At step 603 the serving base station BS1 receives the concatenated messages 701 and at the same time measures signal properties of the radio signals conveying the messages 701 from the first mobile station MS1. The measured DCCH uplink signal properties may be any combination of received signal strength, bit error rate and time synchronization error.

At step 604 the serving base station BS1 reports the origination access event to the mobile services switching centre MSC1. The origination access report, 702 in FIG. 7, includes the received Origination message data and both the DCCH downlink properties, measured at the first mobile station MS1 and reported in the MACA Report message, and the DCCH uplink properties measured at the serving base station BS1.

At step 605 the mobile services switching centre MSC1 evaluates the conditions for radio communication between the serving base station BS1 and the mobile station MS1 based on the measured signal properties. Step 605 may be performed by comparing the measured signal properties to corresponding threshold values and based on said comparisions qualify the conditions for radio communication as e.g. excellent, good, average or less than average. The evaluation may be based on a single measured radio signal property, e.g. the downlink word error rate measured at the first mobile station MS1, or a combination of several measured signal properties. The threshold values are selected to provide a desired balance of reduced protocol overhead and message transfer robustness.

At step 606 the mobile services switching centre MSC1 selects a digital traffic channel, e.g. DTC1 in FIG. 1, for use during the outgoing call.

At step 607 the mobile services switching centre MSC1 transmits a message, 703 in FIG. 7, containing a channel designation order and an indication of the prevailing conditions for radio communication to the serving base station BS1. Upon receiving the channel designation order the base station BS1 activates the digital traffic channel DTC1 and prepares a digital traffic channel designation message, 704 in FIG. 7, for transmission to the first mobile station MS1 containing information on the digital traffic channel DTC1.

At step 608, the serving base station BS1 selects a mode of providing frame receipt status information from the first mobile station MS1 to the serving base station BS1 which is to be applied during transfer of the digital traffic channel designation message. The mode of informing is selected based on the indication of the prevailing conditions for radio communication received from the mobile services switching centre MSC1. An exemplary set of general rules, used by the serving base station BS1 for selecting-a-mode of providing frame receipt status information during transfer of a message requiring a plurality of frames on the downlink ARCH and SMSCH channels, are as indicated below.

If the conditions for radio communication are deemed to be excellent, the serving base station BS1 selects to use an unacknowledged mode of operation, i.e. no frame receipt status information is transmitted to the serving base station BS1. This implies that instead of using the ARQ BEGIN frame and ARQ CONTINUE frame formats illustrated in FIG. 4, the serving base station BS1 uses MSID frame and CONTINUE frame formats during transfer of the message.

If the conditions for radio communication are deemed to be good, the serving base station BS1 selects to use an ARQ mode of operation wherein the PI field is set to one in the last ARQ CONTINUE frame, i.e. the first mobile station MS1 is requested to provide frame receipt status information upon receipt of the last frame conveying the message.

If the conditions for radio communication are deemed to be average, the serving base station BS1 selects to use an ARQ mode of operation wherein the PI field is set to one both in the ARQ BEGIN frame and the last ARQ CONTINUE frame, i.e. the first mobile station MS1 is requested to provide frame receipt status information upon receipt of the first and the last frame conveying the digital traffic designation message. As discussed earlier, this corresponds to the ARQ mode used in present CMS88 messages when transferring messages on the ARCH or SMSCH subchannels.

If the conditions for radio communication are deemed to be less than average, the serving base station BS1 selects to use an ARQ mode of operation wherein the PI field is set to one in both the ARQ BEGIN frame and the last ARQ CONTINUE frame but also in every $x^{th}$ ARQ CONTINUE frame, where x is chosen depending on how poor the conditions for radio communication are deemed to be. The value x determines thus how frequently the first mobile station MS1 is requested to provide frame receipt status information. In general, a low value of x is chosen if the conditions for radio communication are poor and a higher value of x is chosen if the conditions for radio communication are better.

Since the digital traffic designation message is a message typically requiring segmentation into two frames, the general rules of the example above result in the same ARQ mode of operation under both average and less than average conditions.

Other rules for selecting a mode of providing frame receipt status are possible to define without departing from the scope of the invention.

At step 609, the digital traffic channel designation message, 704 in FIG. 7, is transferred in the required two frames from the serving base station BS1 to the mobile station MS1. During transfer of the message 704, the selected mode of providing frame receipt status information is applied. If the mobile station MS1 returns an ARQ STATUS message indicating that a transmitted frame has not been received successfully by the mobile station MS1, the serving base station BS1 may either retransmit the lost frame or abort the message transfer transaction.

Figure 8:
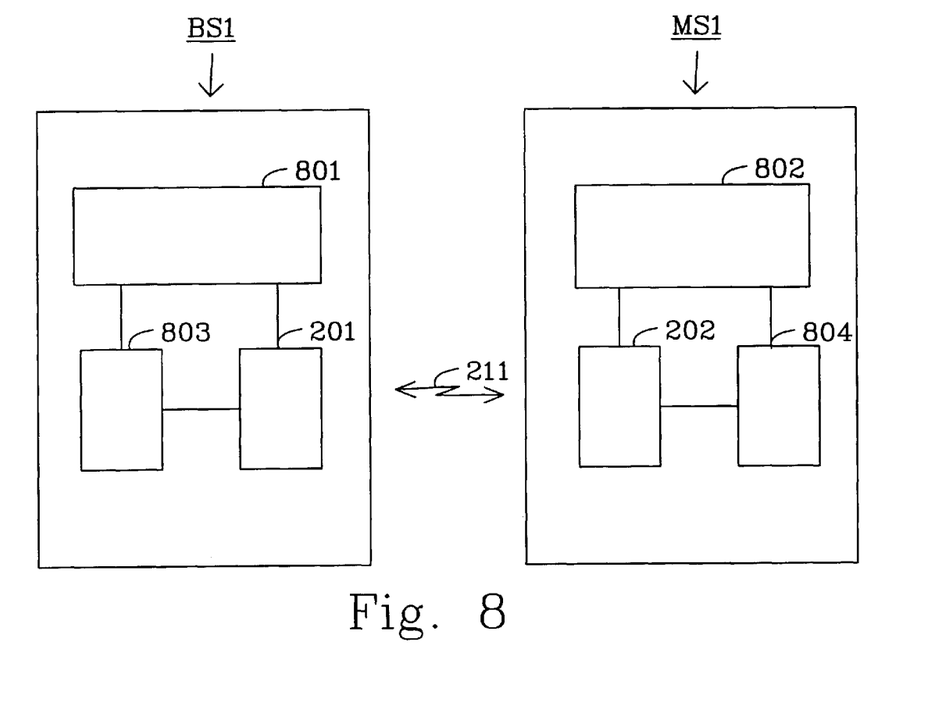
FIG. 8 is a block diagram illustrating function blocks related to the invention at a base station and a mobile station.

FIG. 8 is a schematic block diagram illustrating function blocks related to the present invention in the serving base station BS1 and the first mobile station MS1.

The serving base station BS1 includes, in addition to the first communication function block 201 introduced in FIG. 2, a first measuring block 803 and a first control block 801.

The first mobile station MS1 includes, in addition to the second communication function block 202 introduced in FIG. 2, a second measuring block 804 and a second control block 802.

As described in connection with FIG. 2, the first communication block 201 and the second communication block 202 handles transfer of messages between the serving base station BS1 and the first mobile station MS1 in accordance with the TIA/EIA IS-136 specifications. Thus the communication blocks 201 and 202 are involved when performing steps 602, 603 and step 609 in FIG. 6.

The first measuring block 803 at the serving base station BS1 performs measurement of signal properties, e.g. received signal strength and bit error rate, of radio signals 211 received by the serving base station BS1 from the first mobile station MS1. Thus the measuring block 803 at the serving base station BS1 performs the measurements at step 603 in FIG. 6.

The second measuring block 804 at the first mobile station MS1 performs measurement of signal properties, e.g. received signal strength and bit error rate, of radio signals 211 received by the first mobile station MS1 from the serving base station BS1. Thus the measuring block 804 at the first mobile station MS1 performs the measurements at step 601 in FIG. 6.

The first control block 801 at the serving base station BS1 is responsible for overall control of the operation of the serving base station BS1. One of the functions performed by the control block 801 is to select the mode of providing frame receipt status information at step 608 in FIG. 6. The first control block 801 instructs the first communication block 201 that the selected mode of providing frame status information is to be used when performing the message transfer transaction in the downlink direction of the digital control channel DCCH1 at step 609 in FIG. 6.

The second control block 802 at the first mobile station MS1 is responsible for overall control of the operation of the mobile station MS1. When performing a message transfer transaction in the uplink direction of the digital traffic channel DTC1, the second control block 802 selects a mode of providing frame receipt status information during the message transfer transaction based on radio signal properties measured by the second measuring block 804 for radio signals 211 received by the first mobile station MS1 from the serving base station BS1. The second control block 802 instructs the second communication block 202 that the selected mode of providing frame status information is to be used when performing the message transfer transaction on the uplink digital traffic channel DTC1.

Apart from the examplifying embodiments of the invention disclosed above, there are several ways of providing rearrangements, modifications and substitutions resulting in additional embodiments of the invention.

As a person skilled in the art appreciates, the invention is in no way limited to TIE/EIA IS-136 compliant radio communication systems. The invention is applicable to a wide range of other radio communication systems where it is possible to select a mode of informing a transmitting unit of frame receipt status at a receiving unit when performing a message transfer transaction. Said selection may comprise selecting whether to use an unacknowledged mode or an acknowledged mode (ARQ mode) of informing. Said selection may also comprise adaptation of an acknowledged mode of informing by selecting when the receiving unit should report frame receipt status back to the transmitting unit.

One example of another application of the invention, is in a radio system supporting packet data services. Evolutions of the TIA/EIA IS-136 specifications supporting integrated voice and packet data services in a radio communication system are currently under discussion. In this evolved TIA/EIA IS-136 specifications a packet control channel (PCCH) and a packet traffic channel (PTCH) supporting packet data transmissions will be introduced. A Medium Access Control (MAC) protocol layer is introduced which will support an ARQ mode of operation on both the PCCH and the PTCH both downlink and uplink. The ARQ mechanism in the new MAC protocol is very similar to the ARQ mechanism used in the downlink direction of a digital control channel according to the present TIA/EIA IS-136 specifications.

Hence the present invention may be applied on both the PCCH and the PTCH in both the downlink and uplink directions.

What is claimed is:

1. A method in a radio communication system for performing a message transfer transaction in which at least one message is transferred in at least one frame from a first unit to a second unit using digitally modulated radio signals, the method comprising the steps of:

a) measuring properties of radio signals exchanged between the first unit and the second unit;

b) selecting a mode of informing the first unit of frame receipt status at the second unit during the message transfer transaction based on the measured signal properties;

c) transferring the at least one message in the at least one frame from the first unit to the second unit while informing the first unit of the frame receipt status at the second unit in accordance with the selected mode of informing.

2. A method according to claim 1, wherein said properties measuring step a) comprises measuring radio signal properties reflecting conditions for radio communication between the first unit and the second unit.

3. A method according to claim 1, wherein steps a) and b) are performed prior to transferring any one of the at least one frame to the second unit.

4. A method according to claim 1, wherein step b) comprises selecting an unacknowledged mode, in which the first unit is provided with no information of the frame receipt status at the second unit, or an acknowledged mode, in which the first unit is provided with information of the frame receipt status upon receipt of at least one of the at least one frame by the second unit.

5. A method according to claim 4, wherein the acknowledged mode is selected when the measured radio signal properties, as compared to corresponding predetermined threshold values, indicates bad conditions for radio communication and the unacknowledged made is selected when the measured radio signal properties, as compared to the corresponding predetermined threshold values, indicates better conditions for radio communication.

6. A method according to claim 1, wherein step b) comprises selecting a mode to inform the first unit of the frame receipt status upon receipt of at least one elected frame of the at least one frame by the second unit.

7. A method according to claim 6, wherein step b) comprises selecting a mode to inform the first unit of the frame receipt status upon receipt of the first frame of the at least one frame by the second unit.

8. A method according to claim 6, wherein the message transfer transaction comprises at least two frames and step b) comprises selecting a mode to inform the first unit of the frame receipt status upon receipt of the last frame of the at least two frames by the second unit.

9. A method according to claim 6, wherein the message transfer transaction comprises at least three frames and step b) comprises selecting a mode to inform the first unit of the frame receipt status upon receipt of at least one frame in between the first frame and the last frame of the at least three frames by the second unit.

10. A method according to claim 6, wherein step b) comprises selecting a mode to inform the first unit of the frame receipt status at the second unit more frequently when the measured radio signal properties indicates bad conditions for radio communication and less frequently when the measured radio signal properties indicates better conditions for radio communication.

11. A method according to claim 1, wherein the first unit is a base station, the second unit is a mobile station and step c) comprises transferring the at least one message in the at least one frame on a control channel.

12. A method according to claim 1, wherein the first unit is a base station, the second unit is a mobile station and step c) comprises transferring the at least one message in the at least one frame on a digital traffic channel.

13. A method according to claim 11, wherein step a) comprises measuring properties of radio signals received by the base station from the mobile station.

14. A method according to claim 11, wherein step a) comprises measuring properties of radio signals received by the mobile station from the base station and step a) further comprises the step of:
reporting the radio signal properties measured at the mobile station to the base station.

15. A method according to claim 1, wherein the first unit is a mobile station, the second unit is a base station and step a) comprises measuring properties of radio signals received by the mobile station from the base station.

16. A method according to claim 15, wherein step c) comprises transferring the at least one message in the at least one frame on a digital traffic channel.

17. A radio communication system comprising:
a first unit having first radio communication means;
a second unit having second radio communication means;
a measuring means for measuring properties of radio signals exchanged between the first unit and the second unit, wherein the first radio communication means and the second radio communication means are adapted to perform a message transfer transaction in which at least one message is transferred in at least one frame from the first radio communication means in the first unit to the second radio communication means in the second unit using digitally modulated radio signals; and
a selecting means for selecting a mode of informing the first radio communication means of frame receipt status at the second radio communication means based on the measured radio signal properties, wherein the first radio communication means and the second radio communication means are adapted to perform the message transfer transaction using the selected mode of informing the first radio communication means of the frame receipt status at the second radio communication means.

18. A radio communication system according to claim 17, wherein the measuring means is adapted to measure radio signal properties reflecting conditions for radio communication between the first unit and the second unit.

19. A radio communication system according to claim 17, wherein the selecting means is adapted to select the mode of informing prior to transfer of any one of the at least one frame to the second radio communication means.

20. A radio communication system according to claim 17, wherein the selecting means is adapted to select an unacknowledged mode, in which the first first radio communication means is provided with no information of the frame receipt status at the second radio communication means, or an acknowledged mode, in which the first radio communication means is provided with information of the frame receipt status at the second radio communication means upon receipt of at least one of the at least one frame by the second radio communication means.

21. A radio communication system according to claim 20, wherein the selecting means is adapted to select the acknowledged mode when the measured radio signal properties, as compared to corresponding predetermined threshold values, indicates bad conditions for radio communication and to select the unacknowledged mode when the measured radio signal properties, as compared to the corresponding predetermined threshold values, indicates better conditions for radio communication.

22. A radio communication system according to claim 17, wherein the selecting means is adapted to select a mode of informing in which the first radio communication means is informed of the frame receipt status at the second radio communication means upon receipt of at least one elected frame of the at least one frame by the second radio communication means.

23. A radio communication system according to claim 22, wherein the selecting means is adapted to select a mode of informing in which the first radio communication means is informed of to frame receipt status at the second radio communication means upon receipt of the first frame of the at least one frame at the second radio communication means.

24. A radio communication system according to claim 22, wherein the message transfer transaction comprises at least two frames and the selecting means is adapted to select a mode of informing in which the first radio communication means is informed of the frame receipt status at the second radio communication means upon receipt of the last frame of the at least two frames at the second radio communication means.

25. A radio communication system according to claim 22, wherein the message transfer transaction comprises at least three frames and the selecting means is adapted to select a mode of informing in which the first radio communication means is informed of the frame receipt status at the second radio communication means upon receipt of at least one frame in between the first frame and the last frame of the a least three frames by the second radio communication means.

26. A radio communication system according to claim 22, wherein the selecting means is adapted to select to Inform the first radio communication means of the frame receipt status at the second radio communication means more frequently when the measured radio signal properties indicate bad conditions for radio communication and less frequently when the measured radio signal properties indicate better conditions for radio communication.

27. A radio communication system according to claim 17, wherein the first unit is a base station, the second unit is a mobile station and the first communication means and the second communication means are adapted to transfer the at least one frame on a control channel.

28. A radio communication system according to claim 17, wherein the first unit is a base station, the second unit is a mobile station and the first communication means and the second communication means are adapted to transfer the at least one frame on a digital traffic channel.

29. A radio communication system according to claim 27, wherein the measuring means comprises measuring means located at the base station and adapted to measure properties of radio signals received by the base station from the mobile station.

30. A radio communication system according to claim 27, wherein the measuring means comprises measuring means located at the mobile station and adapted to measure properties of radio signals received by the mobile station from the base station, and the first radio communication means and the second radio communication means are adapted to transfer a report of the signal properties measured by the measuring means at the mobile station to the base station.

31. A radio communication system according to claim 17, wherein the first unit is a mobile station, the second unit is a base station and the measuring means is located at the mobile station and adapted to measure properties of radio signals received by the mobile station from the base station.

32. A radio communication system according to claim 31, wherein the first communication means and the second communication means are adapted to transfer the muitiframe message on a digital traffic channel.

* * * * *